United States Patent [19]

Zimmer

[11] Patent Number: 4,799,859
[45] Date of Patent: Jan. 24, 1989

[54] HELICOPTER ROTOR BLADE CONTROL

[75] Inventor: Herbert Zimmer, Friedrichshafen, Fed. Rep. of Germany

[73] Assignee: Dornier GmbH, Friedrichshafen, Fed. Rep. of Germany

[21] Appl. No.: 927,656

[22] Filed: Nov. 5, 1986

[30] Foreign Application Priority Data

Nov. 6, 1985 [DE] Fed. Rep. of Germany ....... 3539338

[51] Int. Cl.$^4$ .............................................. B64C 27/18
[52] U.S. Cl. .................................. 416/20 R; 416/20 A; 416/90 A
[58] Field of Search ................. 416/20 R, 20 A, 90 A

[56] References Cited

U.S. PATENT DOCUMENTS

| | | | |
|---|---|---|---|
| 2,410,545 | 11/1946 | Main | 416/114 |
| 3,348,618 | 10/1967 | Flint et al. | 416/90 A |
| 3,349,853 | 10/1967 | Flint et al. | 416/90 A |
| 3,554,662 | 1/1971 | Lemont | 416/114 X |
| 3,713,750 | 1/1973 | Williams | 416/20 R |
| 3,816,019 | 6/1974 | Norman et al. | 416/20 R |
| 3,862,811 | 1/1975 | Bernaerts | 416/20 R |
| 3,904,313 | 9/1975 | Bernaerts | 416/20 A |
| 4,132,500 | 1/1979 | Reader et al. | 416/20 R |
| 4,242,044 | 12/1980 | McCoubrey | 416/20 A |
| 4,493,361 | 1/1985 | D'Anna | 416/90 A |
| 4,507,050 | 3/1985 | Jeffery et al. | 416/90 A |
| 4,534,702 | 8/1985 | Johnson et al. | 416/20 R |
| 4,573,871 | 3/1986 | Krauss et al. | 416/20 R |
| 4,583,704 | 4/1986 | Krauss et al. | 416/20 A |
| 4,655,685 | 4/1987 | Fradenburgh | 416/90 A |

FOREIGN PATENT DOCUMENTS

907625 3/1954 Fed. Rep. of Germany ... 416/20 A

Primary Examiner—Everette A. Powell, Jr.
Attorney, Agent, or Firm—Ralf H. Siegemund

[57] ABSTRACT

The present invention relates to a circulation flow control rotor system for an aircraft which includes rotor blades provided with slit shaped blower nozzles further comprising control devices for obtaining a cyclic or multicyclic or collective rotor blade angle control under utilization of individual pressure gas flow from a pressure chamber to the nozzle slits; further including deformable control members which are going to be deformed in accordance with certain rules underlying the requisite control.

14 Claims, 5 Drawing Sheets

HELICOPTER ROTOR BLADE CONTROL

BACKGROUND OF THE INVENTION

Lift as well as forward motion in helicopters is usually provided for by a principle rotor system; the rotor also provides for attitude control. In order to compensate the momentum as well as for controlling the craft around the main vertical axis, secondary tail end rotor is provided whose axis extends perpendicular to the direction of flight. Helicopters of this known type generally have optimum hovering properties but are inferior as compared to regular air foil aircraft, owing to a considerably reduced forward propagation speed; also range and economy of helicopters are inferior to regular aircraft. The reason for the limited forward propagation speed is to be seen in that in case of an increase of that speed the oncoming flow towards the blade that moves in the direction of flight approaches the speed of sound so that the resistance at that blade and in that instance increases rather drastically. On the other hand as the rotor blade moves in the opposite direction the flow will in fact separate over a large area, owing to the large angle of attack of the blades. Moreover, large zones and areas of the rotor blades have to be and are in fact being subjected to an oncoming flow from the rear.

In order to increase the operative range generally towards larger propagation speeds it is basically necessary to overcome the limit which obtains when the reversely moving blades, owing to flow separation, simply can no longer produce the requisite lift. This speed limit can be overcome by forcing flow of pressurized air out of slots in the rotor, particularly the leading and trailing edges thereof so as to obtain a circulation control such that the lift production at and by the rotor blades becomes independent from the flow of air towards the blade in any location. Aircraft using circulation control are basically known. It is also known to provide a control disk for a higher harmonic kind of mechanical control of the pressure medium which control disk is both stationary and flexible and through appropriate control and is being deformed in accordance with prescribed rules.

DESCRIPTION OF THE INVENTION

It is an object of the present invention to provide a new and improved circulation and air flow control in, through and out of rotor blades of helicopters such that the reliability of functions particularly in view of the requisite change in shape of flow control members are improved.

In accordance with the preferred embodiment of the present invention, it is suggested to use control members which have annular control surfaces corresponding to an annular area across which pass openings of tubes feeding a pressurized gas flow to the discharge slits in the rotor blades and these control members are configured for contour variation in the azimuthal direction, the variations being deformations in a direction transversely (axially or radially) thereto and in an order of magnitude corresponding to the requisite spatial variation for effectively varying the control gaps between the openings on one hand and the effective, flow throttling control surfaces of the control members on the other hand.

The features of the invention establish a configuration of a circulation flow control by means of which the aforementioned limit helicopters is no longer applicable because now the lift is produced independently from relative local variations in the oncoming flow towards the respective rotor blades. This then is the result of the effective control device which thereby as far as construction and operation is concerned is much more reliable with an increase use life as compared with known constructions. Unfavorable action on the control members will no longer be observed because there is no longer action on part of a control device using control valves or the like. Moreover the inventive configuration including a deformation of the control disks for a higher harmonic kind of mechanical control of the pressure medium permits a very close matching of operational action towards the theoretical requirements of physical laws concerning the control operation.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
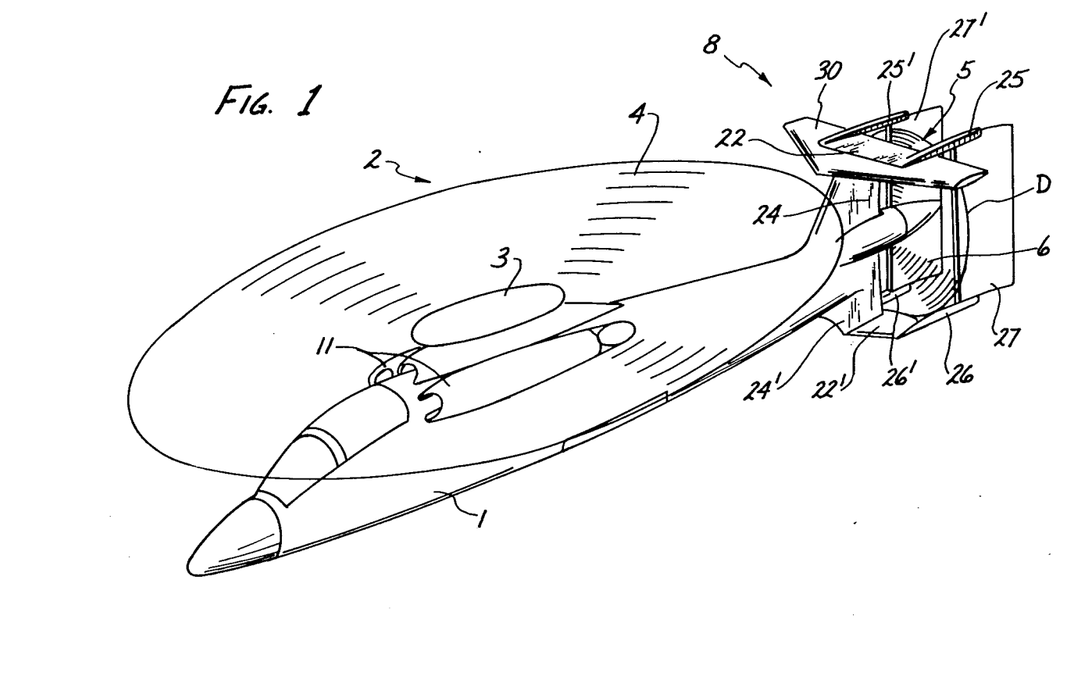
FIG. 1 is a perspective view of a helicopter improved in accordance with the preferred embodiment of the present invention for practicing the best mode thereof.

Proceeding to the detailed description of the drawings, FIG. 1 illustrates a helicopter having a fuselage or aircraft equipment compartment 1; a rotor 2 being comprised of a rotor head 3 from which extend blades 4. The rotor provides for the principal lift. Forward thrust is provided by a propeller 6 in the rear or tail end of the craft. The X-Y-Z axes respectively denote roll, pitch and yaw axes of the craft; the pitch axis being of course also the axis that extends transverse to the longitudinal axis of the craft; the latter being equivalent to the roll axis.

The craft is provided with control flaps 7 for control for the craft in relation to the yaw axis. The elevator 8 provides for control of the craft in relation to the transverse or pitch axis. A general propulsion system and power plan 11 is provided for driving the principal rotor 2 as well as the forward thrust producing propeller 6. A blower (compressor) is provided but not shown in FIG. 1 which generates the requisite pressurized air for obtaining the circulation control of and in the rotor system. This blower is geared through a suitable transmission to the principal propulsion system 11. A control unit 16 to be described more fully below is provided for control of the pressurized air i.e for the control of the air flow towards nozzle slits in the rotor blades 4. This control device 16 is part of and contained in the rotor head 3.

Figure 2:
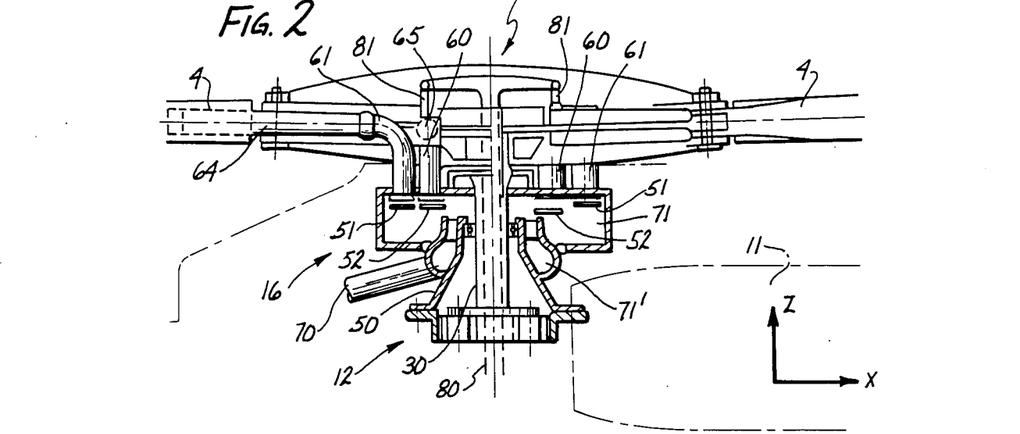
FIG. 2 illustrates a section view through a portion of FIG. 1 showing a particular longitudinal section through the propeller head.
Figure 3:
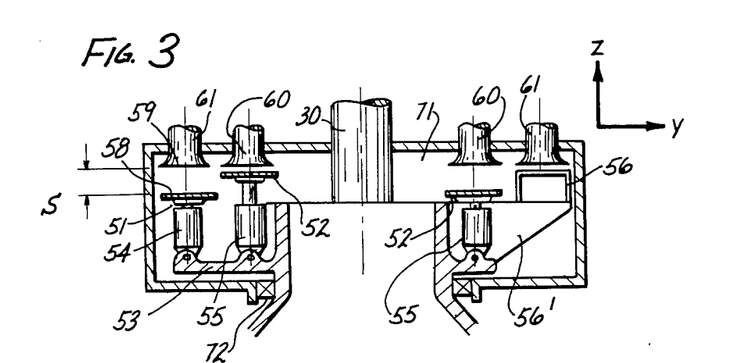
FIG. 3 is an enlarged portion of FIG. 2 showing a transverse section plane for illustrating details of the rotor blade control.
Figure 4:
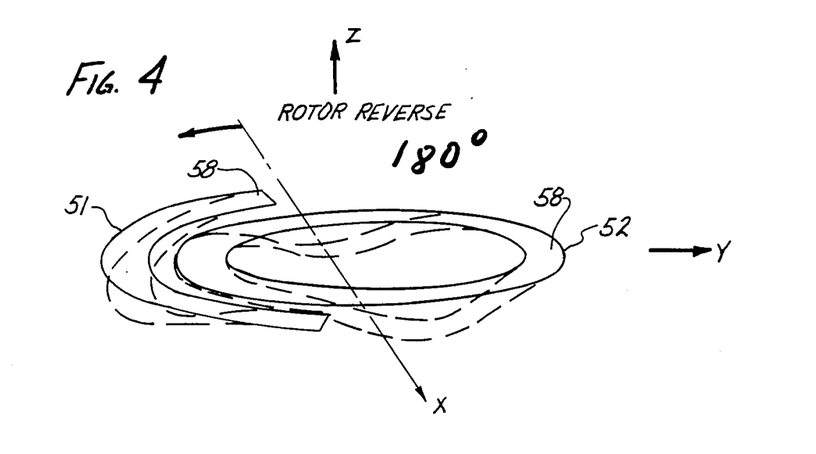
FIG. 4 illustrates a portion of FIG. 3 and is a schematic showing of the principal configuration of control surfaces, the view being a perspective one.

FIGS. 2,3,4 illustrate a rotor system operating basically in accordance with the known system of a circulation control but including novel features of the invention; particularly the system is provided without bearings and hinges. As stated the rotor 2 is driven by means of the propulsion device 11 of the craft under use of a transmission gear 12 having the rotor shaft 30 as output. The circulation control obtains through the blowing of pressurized air out of slits along the leading and/or trailing edges of the rotor blades. The control of the air flow operates in accordance with suitable control laws involving higher harmonics and without requiring rotating parts other than elements that rotate anyway as part of the rotor. The rotor system moreover is provided with a mechanical control for the collective blade adjustment. This adjustment includes a central rod 80 traversing the hollow rotor shaft 30 and operating a linkage 81 by means of which the blades are attitude controlled in a conventional manner.

Proceeding to the detailed description of the control unit 16 shown as far as its principal components are concerned and as shown in FIG. 2,3,4 unit 16 is comprised of a stationary housing 50 that is stationary vis-a-vis the revolving rotor head 3. The housing has two concentrically arranged control members 51 and 52 various examples and variations of these control members are shown in figs. 8,9,19,11,12. The control members 51 and 52 are all operated (i.e. deformed) respectively by sets of piston cylinder drives, 54 and 55. A plurality of such piston cylinder drives are arranged along the periphery of the control member 51; others are arranged along the periphery of control member 52. In each instance the respective cylinder housing is connected to stationary housing 50 while the pistons and piston rolds are linked to various portions of the control members 51 and 52.

The drives 54 particularly operate the control member 51 which controls the blowing of air through slots in the leading edge of the various rotor blades. Analogously piston cylinder drives 55 act on the control member 52 which controls the air flow through the slots along the trailing edges of the respective blades. More specifically, the control by drives 54,55 involves axial displacement of local portions of annular control members 51,52 so as to vary proximity thereof to entrance openings 59 of tubes 60 and 61 which feed pressurized air from a chamber 71 to the rotor blades and the several slots therein. The drives 54 and 55 themselves are operated and controlled through hydraulic and pneumatic devices that are operated by the pilot and is by itself not illustrated here for facilitating illustration. This kind of a piston drive control is basically known as slide operations and can be used here and involves control of feeding the pressure medium to the respective cylinder for operating and adjusting the respective piston position either in the cylinders 54 or 55 or both. The control is independent for the two sets 54 and 55.

The operative part in each control annulus 51,52 is its central surface 58 facing the openings 59 of the respective tubes 60 and 61. The control surfaces are collectively as well as individually designated in the figures by reference numeral 58. These members 51 and 52 remain stationary relative to the rotor 2. They cooperate with openings 59 of air feed tube 60 and 61 which are connected to air feeder channels 64 and 65 respectively. If all drives, say 54, are in the same position and are operated in unison, they just vary the distance of the now strictly planar surface(s) 58 from the openings 59 of tubes 61. However, if the drives 54 position their piston rods 54' differently, an undulation or waviness is introduced along the azimuth and as a specific deformation of that surface 58 of member 51 (see e.g. FIG. 4). As the rotor rotates, including the tubes 60,61 the openings 59 thereof pass the different portions of the control members 51,52 as they have been deformed and the flow into the tubes as thus modulated.

The channels 64,65 extend inside the rotor blade in longitudinal directions and rotate therewith. During rotation of the rotor the openings 59 of the tube 60 and 61 of the rotor blades slide above the surfaces 58 but without engaging the control surfaces 58. The rotation is carried out in a horizontal plane or if related to the control periphery U in a plane averaging a single or multiple deformed contour of the control members 51 and 52.

Figure 5:
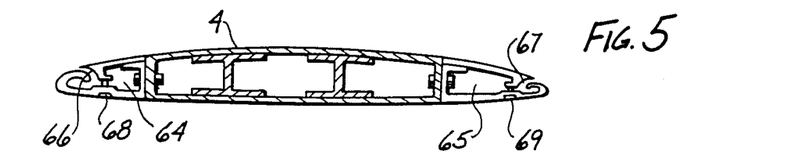
FIG. 5,6,7 are schematic cross sections through the rotor blade showing particularly the nozzle slits on leading and trailing edges.
Figure 6:
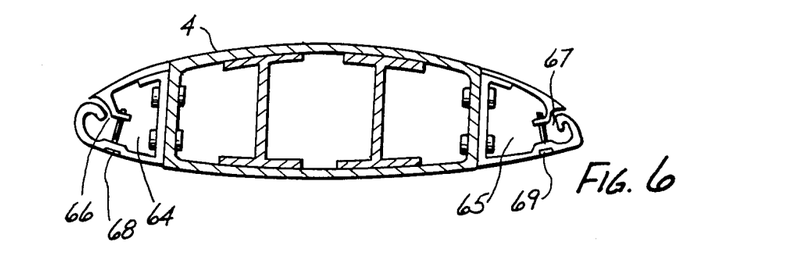
Figure 7:
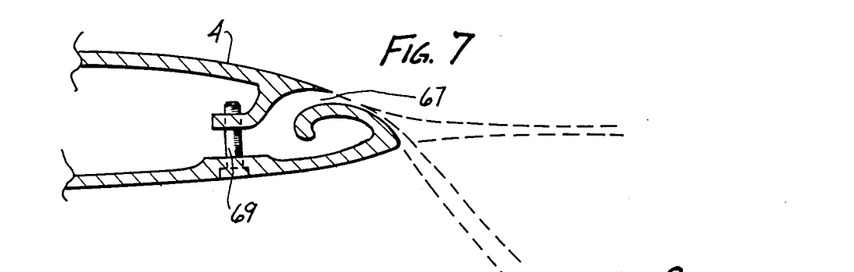

In accordance with FIGS. 5,6,7 slots 66 and 67 for air are provided respectively along the leading and trailing edges of the respective blades 4. The gap of the nozzle slit 66 and 67 is preadjusted by means of trimming or adjusting screws 68 and 69 respectively. As shown in FIG. 5,6 and 7 this aspect has been mentioned earlier and it is now repeated that these slots are continuously in air flow communication with the duct 64 and 64. The control member 51 is provided for the control of air which has been pressurized by a compressor, towards the slits 66 along the leading edge of the rotor blade. The control member 52 is variably deformible along its entire annular configuration. The control member 51 is actually rigid over a range of 0 to 180 degrees corresponding to a motion of rotor blades 4 in the direction of flight. This way the control surface 58 of the rigid portion of member 51 covers the openings 59 of the air feeding duct in this area and blocks them completely (see 56 in FIG. 3). In other words as a tube 61 passes over the undeformible portion 56 of control member 51 little if any air will enter. The respective blade 4 with which that tube 61 is associated is in that instant describing an arch that has a forward component with reference to the forward motion of the aircraft. The contour of control member 51 is controlled (controllable) only in the area of the return path of the blade covering 180 to 360 degrees (FIG. 4). The rigid section of the control member 51 is supported by a stationary bearing member 56'.

Air is fed from a compressor (not shown) via a feed pipe 70 to an annular plenum 71' adjacent to the stationary housing 50 and being sealed from a rotary plenum 71 by means of seals 72; plenum 71' feeds of course plenum 71. FIG. 4 can be construed in two ways. In one aspect it illustrates schematically the azimuthal modulation (corrugation) of the control members. In another aspect it can be construed as a direct embodiment in which the member is a single coherent or continuous annulus made of a flexible material and 51 is a semi-annulus of the same material.

Figures 8, 8A:
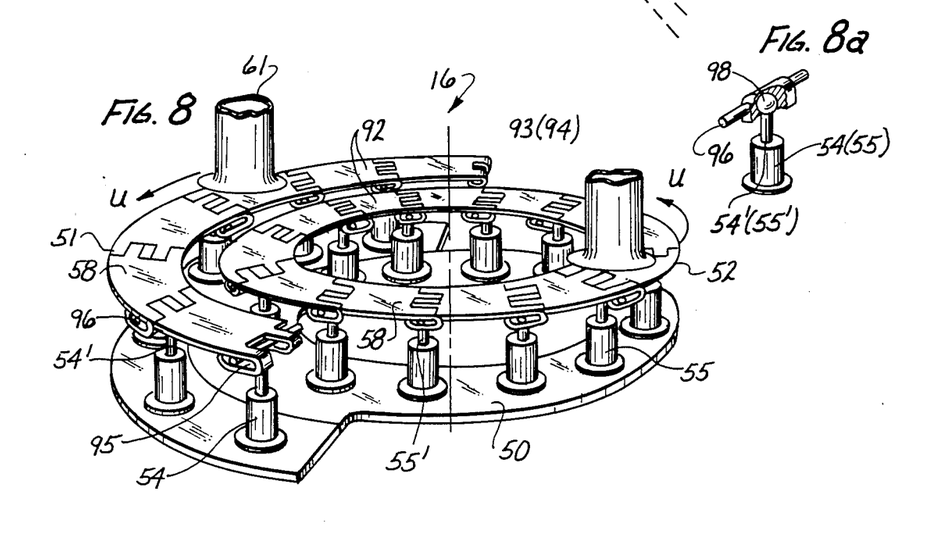
FIG. 8 illustrates a perspective view of a portion of FIG. 2 and 3 showing a particular configuration of the control annulus involved in the circulation control.
FIG. 8a is a detail of the control device shown in FIG. 8; the view being perspective one.

The control apparatus 16 for the circulation control of the rotor blades 4 has control members which in terms of function correspond to the control members 51 and 52 as shown in FIG. 4. However, the deformability is differently realizable. In FIG. 8 and 8a they are composed of hinged together sector segments 92 which together establish in each instance an annulus with an annular control surface 58 even though these segments are to some extent movable in relation to each other (control member 51 is of course also here realized by a half-annulus or semi-annulus). The sector segments 92 of each of the control members 51 and 52 have projections 93 which extend in azimuthal direction and they have also indents 94, interdigitizing with the projections 93 of the respective adjacent segments 92 in that the projections 93 are inserted into the indents 94 in a hinge-like fashion. Gap shaped indents 95 are formed at the projections and recesses 93 and 94 respectively which extend in peripheral direction because the projections 93 are radially not as wide as the indents 94. Hinge pins 96 on one hand link the projections 93 that pertain to different segments 94 thus hinging them together. On the other hand, owing to the gaps 94 the piston rods 54' or 55' connect at right angles to the hinge pins 96. Thus, one can also say that the pins 96 are carried by the respective control devices 54 and 55. The pins 96 run in a radial direction in parallel to any plane defined by an undeformed control member (51 or 52). There is a certain play in the connection of the respective segments owing to the indents 95 which function as longitudinal gaps; the play is present with respect to the periphery of the control members 51 and 52. The pins 96 for hinging are carried by the pistons 54' and 55' of the piston cylinder drives 54 and 55 respectively under utilization of ball and socket joints 98 which permit free adjustment and disposition of the shafts 96 as shown in FIG. 8a. As stated, in all examples and embodiments the control members (51,52 etc.) are stationary with respect to their periphery while the air feed pipes 60 and 61 rotate together with the head 3 and the blades 4. The locally effective gap as between the openings 59 and the respective control surface portions 58 of the sector segments 92 can be adjusted through the adjusting pistons 54 and 55 of the piston cylinder drives 54 and 55 acting on the shafts 96 which are, as stated, hinged to the pistons 54' and 55'. This way one controls the amount of air pressurized in the plenum chamber 71 and being fed to the control slots 66 and 67 respectively on leading and trailing edges of the blades 4. By means of the projections 93 and 94 in the longitudinal slot 95 and owing to a certain play in the principal plane of the control members on one hand and ball and socket joints 98 on the other hand one can adjust the sector segments 92 so as to have along the annular control surfaces a wavelike contour thus deviating from straight planar configuration. This undulation running transversely to the peripheral direction is freely selectable by means of the independent adjustment and adjusting operation carried out by the piston cylinder drive 54 and 55. In order to obtain a sufficiently differentiated control i.e. in order to obtain so to speak a high resolution in the control, one has to provide a corresponding large i.e. larger number of sector segments 92 having control surface sections 58.

Figure 9:
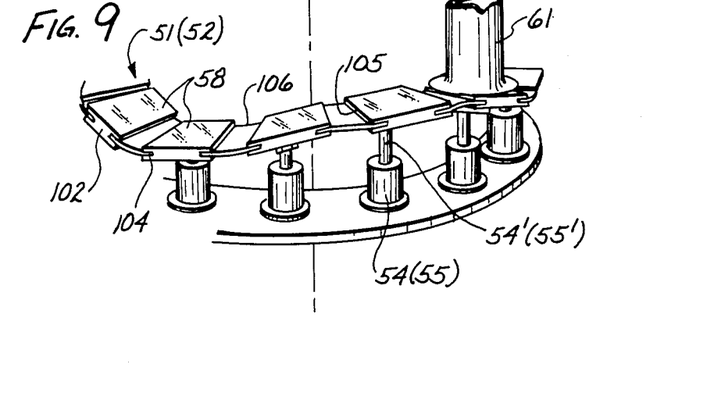
FIG. 9,10,11 are further examples for different control members usable in the devices of the foregoing figures all illustrations showing perspective views.

In the example shown in FIG. 9, the control members 51 and 52 for the control of the pressurized air flow to slots 66 and 67 respectively in the leading and trailing edges of the rotor blades sector shaped rigid plates 102 are provided with radial slots 104 being formed as between adjacent radial, azimuthally extending ends 105. The plates 102 establish on one hand the connection to the pistons 54',55' and on the other hand the elements 102 form the control surfaces 58 for controlling the air flow to the tubes 60 and 61. The plates 102 are interconnected by inserts 106 made of elastically deformable material and being inserted into the slots 104. These segments 102 as well as the inserts 106 have a certain play with reference to the periphery of the respective control annulus (51,52) in radial direction and also with respect to the horizontal principle plane. Plates 102 together form an annulus (i.e. annuli for the two control elements 51,52) and in cooperation with the inserts 106 they establish the respective control surfaces 58. For reasons of simplification only one of the control members is illustrated, the other one is analogously configured.

Figure 10:
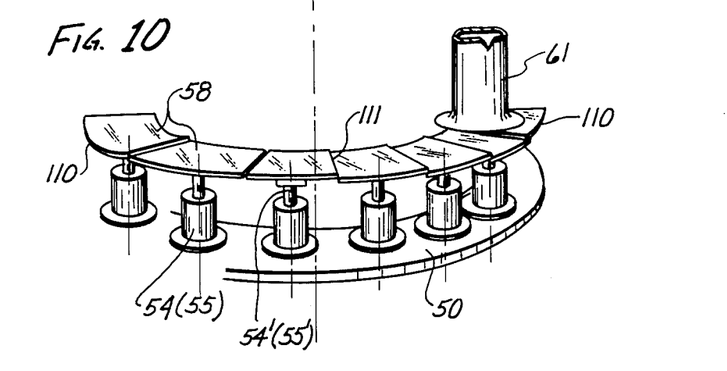

The embodiment shown in FIG. 10 has still differently contoured sector elements 110 which in a peripheral direction and without being interconnected form loosely an annulus, owing to the transversely (radially) oriented juxtaposed edges 111. This assembly establishes the two control members 51 and 52 in this case; the upper side of these sector elements together establish the annular control surface 58. The plate elements 110 are individually carried by the pistons 54' and 55' of the piston cylinder drive 54 and 55. The elements 110 and their respective control surface portions (58) will be placed in different position upon adjustment of the pistons 54' and 55'. Owing to a lack of connection, plates 110 remain untilted when neighboring piston cylinder drives 54 or 55 project the respective rods (54',55') differently. This aspect is different from the tilting as shown in FIG. 8 or 9. The various surface segments 58 thus remain parallel to each other and therefore a kind of variable staircase arrangement obtains. This includes the adjusting of all of the sector plate elements 110 in a coplanar disposition wherein the respective control surfaces 58 are in fact situated in a common horizontal plane. In this case i.e. owing to the lack of the interconnection of the various sector plates 110 they are not subjected to any bending force.

Figure 11:
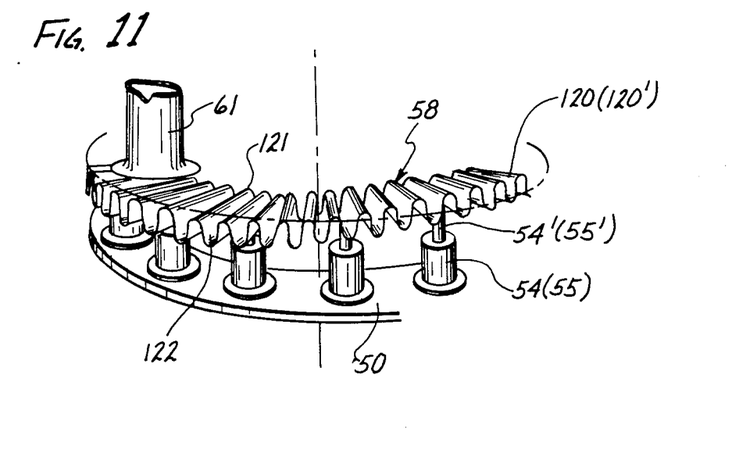

In the example and embodiment shown in FIG. 11 the circulation control is established here through control members 120 and 120' made of resilient material and being deformable owing to a transverse corrugation or folding. The operation in terms of control is similar to the aforedescribed function of 51 and 52. The figure shows the corrogation or folding of the annular part to be quite excessive which is only for reasons of illustration because in relation to dimensions of the various parts as such the "waves" have comparatively small amplitude in reality. The "waves" run radially, that is to say the longitudinal direction of the corrugation peaks 121 and of the corrugation valleys 122 are radial with respect to the center Z of the control members.

The corrugated control members 51 and 52 are now in addition controlled in that another corrugation is superimposed upon the inherent corrugation of these control members which superimposed corrugation runs in peripheral direction i.e. azimuthally, and is controlled through the piston cylinder drives i.e. their respective adjustment piston rods 54' and 55' acting upon the control members on the side opposite to the respective control surface 58. For this the pistons or piston rods 54' and 55' are simply fastened to the respective control member 51 and 52 (120'). In the case of FIG. 11 the configuration is chosen so that upon adjustment of the control members 120 and 121 towards an azimuthally corrugated disposition, and owing to the radial, original corrugation any length and shape changes are automatically compensated.

In the foregoing occasional allusion has been made to the air flow and particularly the air flow to the slots 66 and 67 in the rotor blades 4. This air flow is visible in FIGS. 2,3,4 and also in FIG. 5,6 and 7. Now the air flow control exercised in accordance with the various configurations of FIGS. 8-12 will be explained in detail.

The circulation control of the rotor system is carried out in that pressurized air produced by a compressor (driven by power plant 11) runs through the feeder line 70 into the plenum chambers 71 and 71'. From chamber 71 pressurized air is passed on to the feeder pipe 60 and 61 and from there via ducts 64 and 65 to the exit nozzle slits 66 and 67 respectively extending in direction of the respective rotor blade 4 along the leading and trailing edges thereof. The control members 51 and 52 control, i.e. meter the supply of air from the chamber 71 owing to therespective adjustment as to their contour. The contour adjustment of the control members 51 and 52 involves the contour of the surfaces 58 under utilization of the control drives 54 and 55, to thereby control the relationship of surfaces 58 locally through the feeder channels 64 and 65 that in turn controls the amount of air that is fed to the slot 66 and 67 to the rotor blades.

The control member 51 and 52 assume positively retained and maintained position in annular direction by operation of the annularly distributed control drives 54 and 55. Hence a corrugated or wavy contour establishes any kind of higher harmonic relation vis-a-vis the number of rotor revolutions taken as a base frequency. The members 51 and 52 are stationary with respect to the cylinder piston drive 54 and 55, the feeder tubes 60 and 61 run with the blades 4. Upon relative motion between a blade 4 and their feeder pipes or tubes 60 and 61 on one hand, and the stationary control members 51 and 52 the openings 59 pass without contact along the surface 58 as they are established in each instance by the respective control members 51 and 52. The openings 59 of course pertain to the feeder pipes or tubes 60 and 61. The openings 59 all together are positioned in a common plane. Corresponding to the deformation of the control members 51 and 52 i.e. of their respective control surface 58 the supply of air from the chamber 71 towards the slots 66 and 67 is more or less throttled on account of the variation of the control gap as established between the local portion of the control surface 58 and the opening 59.

The embodiment of FIG. 3,4 shows a rigid control member 51, the gap s is completely closed whenever a blade moves in forward direction from zero to 180 degrees so that in that part the particular rotor blade does not eject or hardly eject any air from the trailing edge. In the illustrated example the collective adjustment of the control of the rotor blade 4 obtains mechanically through the rod 80 and the control lever 81. The rotor blades 4 in this case are secured to the rotor head 3 through an assembly of springs. This package of springs and the resulting clamping permits a variety of movement such as impact pivoting and adjusting angle modification. The collective blade control however can also be obtained by means of the inventive configuration under utilization of means for superimposing cyclical control.

In the case of FIG. 9 the drives 54 and 55 are actuated such that their respective pistons 54' and 55' respectively assume different positions vis-a-vis a stationary plane of a support part or housing 50. This way one forces an undulated contour upon the control members 51 and 52. As was always described with reference to FIG. 8 and 8a one obtains a control of the air flow from chamber 71 to the slot 66 and 67 of the rotor blade. This flow is modulated by the higher harmonics through individual rotation cycles. The inserts 106 are made of a material that admits elastic deformation.

Corresponding to the embodiment shown in FIG. 10 individual sector elements 110 are adjusted by operation of the respective piston cylinder drives, and they remain independent from each other but from a coherent pattern for control. This then establishes a staircase kind of arrangement of the control surface portions 58 which in an envelopelike fashion establishes an azimuthal (annular) corrugation in the direction of periphery U.

In accordance with the embodiment shown in FIG. 11 the piston cylinder drives 54 and 55 force also a particular contour upon the periphery of the control member 120 and 120' resulting again in an azimuthal corrugated or undulated shape of the control surface 58 as seen in the direction of the periphery. This undulation is superimposed upon the corrugation pattern of grooves and ridge 121 and 122. This original corrogation permits the compensation of length changes in peripheral direction or transversely thereto as they obtain by operation of the control. In order to obtain this result the material of which the members 120 and 120' are made should be flexible but exhibit as little as possible extension in length, in radial direction.

Figure 12:
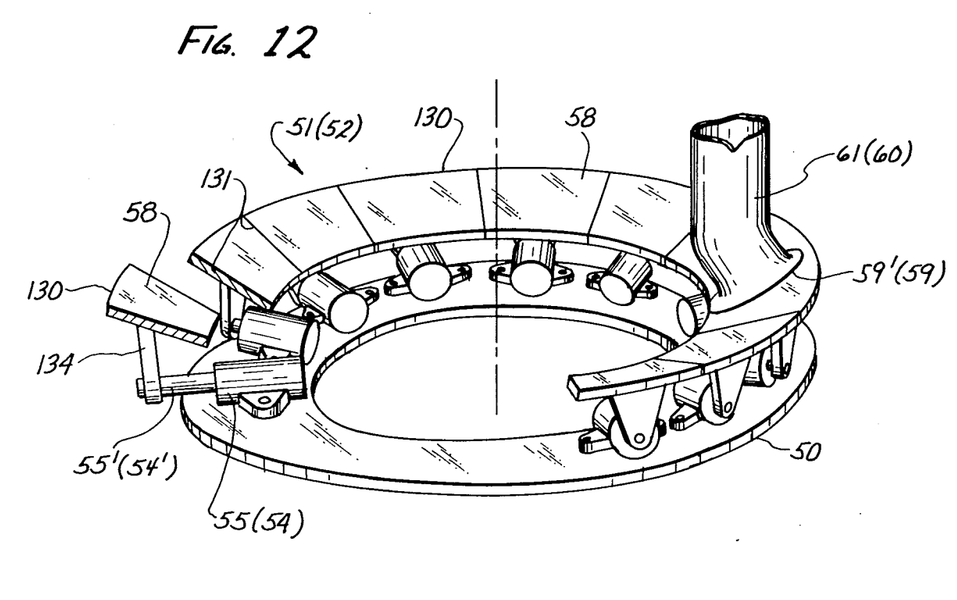
FIG. 12 is a section through another configuration and embodiment of the control annulus by means of which the invention can be practiced; the view is somewhat schematic and also a perspective one.

In the case of FIG. 12 the control annuli are composed of individual elements 130 having surface sections 58 as before for controlling the gap as between openings 59 or 59' of the feeder pipe 60 and 61 respectively. The control elements 130 and their respective control surface portions 58 each have a sector configuration and adjacent ones abuts with their facing azimuthally directed faces 171. In the drawing of FIG. 12 a controlled position of one of the elements 130 is shown for purposes of explaining the adjustment of the control elements wherein the gap S upon passage of that surface portion 58 across openings 59 and 59' are being opened by a predetermined distance and amount. The piston cylinder drives 54 and 55 are arranged also here in a stationary position as far as the radial position of their respective longitudinal axis is concerned and with reference to the horizontal plane and the vertical rotor axis. The respective pistons 54' and 55' on the other hand are adjustable radially but with respect to the stationary house or frame 50. The pistons or piston rods 54' and 55' have carriers 134 to which the elements 130 are fastened.

The elements 130 and their respective control surface portions 58 are inclined vis-a-vis the horizontal plane and together are disposed on an internal cone whereby the openings 59 or 59' of the channel 60 and 61 are analogously inclined in the same sense and orientation. The adjustment of the elements 130 is carried out independent from each other by means of a fluid control (not shown) and one obtains this way also here an adjustment of the contour of the control disks 51 and 52 as composed of the elements 130 which varies in the direction of the periphery U. This variation is effective as variable gap width of the control gap S and accordingly higher harmonic control of the rotor blades is obtained, depending upon the control configuration provided by the wave length of the resulting variation or any desired contour. The inclined arrangement of the elements 130 permits a space saving configuration for the rotor head 3 and the control device 16 particularly vis-a-vis its radial extension from the rotor axis of rotation so that the control elements 54 and 55 can be arranged underneath the elements 130 of which the control members 51 and 52 are composed.

The particular embodiment shown in FIG. 12 permits a modification in that the element 130 are arranged in a common horizontal plane and the control is carried out through a kind of slide control vis-a-vis the openings 59 and 59' in radial direction. Another embodiment of the control devices 16 is realizable in that the radially adjustable elements 130 are oriented vertically and are thus situated on a cylindrical surface having a center axis the axis of rotation of the rotor. The adjustment of the elements 130 is carried out in relation to concentric cylinder surfaces in a radial direction. The openings 59 and 59' of the tube 60 and 61 will be placed also concentric to any of the cylindric surface and with respect to the rotor axis of rotation.

The invention is not limited to the embodiments described above but all changes and modifications thereof, not constituting departures from the spirit and scope of the invention are intended to be included.

I claim:

1. Circulation control for rotor system for helicopter type aircraft wherein blades of the rotor are provided with nozzlelike slots along leading edges and along trailing edges of the blades, there being a control provided for feeding pressurized gas to said slots, the improvement comprising:
    gas feeder tubes with openings and leading to said slots for said feeding of pressurized gas from a plenum chamber;
    a pair of annularly shaped, stationary control members in said plenum chamber, one of said members being a complete annulus, a second one of said members being at least a semi-annulus, and being respectively associated with and disposed in a path for the air flow to the trailing and leading edges of the blades and respectively cooperating with said openings of said gas feeder tubes for said feeder tubes to be at least partially covered by portions of the respective control member upon rotation of the feeder tubes relative to the control members in relation to each other pursuant to rotation of the blades; each of said annulus control member being composed of a plurality of individual control surfaces and sector segments; and
    two pluralities of control means, respectively, connected to said annular control members such that individual ones of the control means are connected to individual ones of the segments, for rendering the control members separately and independently variable in direction of the periphery or transversely thereto such that the resulting variation locally varies respective control gaps between said feeder tube openings and the respective control surface but independently for the two annular members on account of the two pluralities of control means.

2. The improvement as in claim 1, wherein said control members are of a material which permits at least the length change in peripheral direction through elastic deformation.

3. The improvement as in claim 1, wherein said control members are sectionalized in peripheral direction and being made in parts of elastically deformable material.

4. The improvement as in claim 1, wherein said sector segments are physically interconnected there being a gap for play in between adjacent ones of the sector elements.

5. The improvement as in claim 4 wherein said sector segments are hinged together.

6. The improvement as in claim 1 wherein said adjusting devices are coupled to said sector segments by means of ball and socket joints.

7. The improvement as in claim 1 wherein said sector segments are rigid plates there being gaps in between adjacent plates there being flexible inserts interposed.

8. The improvement as in claim 7, wherein said insert permit relative slide movement of adjacent sector segments in relation to each other.

9. A circular flow control system for helicopter rotors having blades with slits in the leading and/or trailing edges, comprising:
    a plurality of duct means rotating with said rotor blades and feeding said slits and having respectively entrance openings likewise rotating with the blades;
    at least annular arrangement of individual control surface elements being variable as to distance from the duct means in a direction and in any location to obtain local variations of a throttling effect provided by the annulus at that location, as any of said openings passes that location; and
    a plurality of individual control means respectively connected to said control surface elements including any said location, to obtain a shape variation of the annulus thereat.

10. The system as in claim 9, said individual elements each having a surface being particularly oriented to said openings when passing, said elements being annularly interconnected.

11. The system as in claim 9, said surfaces being axially directed, said openings passing above them.

12. The system as in claim 9, said surfaces being directed to have at least a radial orientation component.

13. The system as in claim 1, said interconnection being flexible and/or azimuthally yielding.

14. The system as in claim 9 wherein the openings have such an orientation to be parallel to said respective elements when passing.

* * * * *